United States Patent [19]
Streich

[11] Patent Number: 5,671,115
[45] Date of Patent: Sep. 23, 1997

[54] CIRCUIT ARRANGEMENT FOR DRIVING A CONTACTOR

[75] Inventor: Bernhard Streich, Amberg, Germany

[73] Assignee: Siemens Aktiengesellschaft, Munich, Germany

[21] Appl. No.: 569,187

[22] PCT Filed: Jun. 16, 1994

[86] PCT No.: PCT/DE94/00679

§ 371 Date: Dec. 22, 1995

§ 102(e) Date: Dec. 22, 1995

[87] PCT Pub. No.: WO95/00966

PCT Pub. Date: Jan. 5, 1995

[30] Foreign Application Priority Data

Jun. 25, 1993 [DE] Germany .......................... 43 21 252.2

[51] Int. Cl.$^6$ .............................................. H01H 47/22
[52] U.S. Cl. .................................... 361/187; 361/154
[58] Field of Search ........................ 361/187, 152–156, 361/160, 159

[56] References Cited

U.S. PATENT DOCUMENTS

| | | | |
|---|---|---|---|
| 4,618,908 | 10/1986 | Anttila | 361/187 |
| 4,949,215 | 8/1990 | Studtmann et al. | 361/154 |
| 5,459,631 | 10/1995 | Leone et al. | 361/154 |
| 5,490,031 | 2/1996 | Braun et al. | 361/154 |
| 5,557,494 | 9/1996 | Ishikawa et al. | 361/152 |

Primary Examiner—Fritz Fleming
Attorney, Agent, or Firm—Kenyon & Kenyon

[57] ABSTRACT

Electronic driving components sized to drive contactors of a determined power class are generally used. The object of the invention is to create a process and circuitry which allows contactors of different power classes to be driven by a single driving component. The user selects on a scale the switching position corresponding to the contactor to be driven. A reference voltage proportional to the magnitude of the starting current of the respective contactor is thus selected. An automatic regulation keeps constant the starting current during the starting time of the contactor. For that purpose, a measurement voltage proportional to the magnitude of the starting system and dropping across a measuring resistor is supplied to a first input of a comparator, a reference voltage which may be selected by a coding switch (6) being applied to the second input of the comparator. The output of the comparator co-operates with a switching element which switches the starting current. This circuitry may be mounted upstream of existing contactors, in particular on a top hat rail.

14 Claims, 7 Drawing Sheets

CIRCUIT ARRANGEMENT FOR DRIVING A CONTACTOR

BACKGROUND OF THE INVENTION

The present invention relates to a circuit arrangement for driving a contactor in which in the control circuit of the contactor, a controllable switching element, a measuring resistor and the contactor coil of the contactor are in series with a control voltage source and the switching element co-operates with a regulation device such that the contactor is supplied with a starting current of constant average value and the regulation device is connected to switchover means for selecting different starting currents, corresponding to the power classes of different contactors.

Contactors are remote control switches with an electromagnetic actuator. A distinction is made between a control circuit of the contactor with a contactor coil and a load circuit of the contactor to be switched with the connected loads. As soon as a sufficient starting current flows through the contactor coil, the contactor responds and turns on the loads connected in the load circuit. To maintain the contactor in this state, a holding current must flow through the contactor. After the holding current is switched off, the contactor drops out. The energy stored in the contactor coil is dissipated in a free-wheeling circuit.

In German Patent No. DE-OS 37 01 985, series electronic circuitry for a contactor coil is described. A fast power switch and a shunt resistor are arranged in series with the contactor coil which has a free-wheeling diode connected to it. The shunt and the power switch are connected to control electronic circuitry fed from a constant current source.

When the power switch is closed, there is a voltage drop across the shunt resistor which is proportional to the flow of current through the contactor coil. This voltage is compared in a first comparator with a reference voltage tapped off a voltage divider. At the output of this first comparator, a second comparator is connected which has at its positive input a further comparison voltage which drops across another divider tap of the voltage divider. This second comparator drives the fast power switch. The series electronic circuitry requires a relatively low nominal voltage as an operating voltage and can also be used in conjunction with different higher nominal voltages since in the regulation of the contactor coil current, the important matter is not the absolute magnitude of the threshold values present on the comparators but rather their ratio. The ratio of these threshold values is determined through the sizing of the voltage divider.

Accordingly, the series electronic circuitry can be used in conjunction with different operating voltages. In order to drive a contactor of another power class, series electronic circuitry with a differently sized voltage divider is required in each case.

From German Patent No. DE-OS 40 03 179, it is known to arrange a field-effect transistor in the control circuit of the contactor which switches the starting current of the contactor. In parallel to the contactor coil, a free-wheeling diode is provided as a free-wheeling branch.

From German Patent No. DE-OS 37 33 091, it is known to provide in the free-wheeling branch parallel to the contactor coil in addition to the free-wheeling diode a free-wheeling switch which is driven by a control stage based on a closing signal provided by a higher-ranking computing unit. A switch connected in series with the contactor coil is also driven by the same closing signal. The regulation of the free-wheeling branch and of the current flowing through the contactor coil are thus coupled. The dropout time of the contactor is regulated based on the current flowing through the contactor coil.

Moreover, it is known from German Patent No. DE-OS 37 33 091 to provide a measuring resistor in the control circuit of the contactor, the voltage drop across this measuring resistor being a measure for the control current flowing in the control circuit. This voltage drop is compared in a comparator with a value specified by a voltage divider. The voltage divider is set using a potentiometer resistor. It serves as a threshold indicator. The output signal of the comparator is fed via a logic circuit to a switching element arranged in the control circuit of the contactor. The switching element switches the control current of the contactor.

The stated laid open patents each describe arrangements and methods which are suited according to their sizing to driving only a single contactor of a given power class.

It is known that the starting power required to start the contactor is very much greater than the holding power. With contactors having starting currents of, say, 10 A, holding currents of approx. 300 mA are required, i.e., the two currents can differ by a factor of about 30. If the measuring resistor is chosen to be as small as possible with respect to the starting current to be regulated, a small measurement voltage corresponding to the holding current is obtained which can no longer be evaluated for controlling the switching element. Although a measuring resistor having a higher ohmic value would also be suited to controlling the holding current, it would draw an unacceptably high power loss during the starting phase.

The input voltage available for driving the contactor can vary greatly in terms of shape and amplitude. The contactor should always turn on at the right time regardless of this.

An object of the present invention is to specify a circuit arrangement with which contactors of different power classes can be driven with only a single driving component. A further object of the invention is in creating a circuit arrangement of the above stated type with which in a simple manner and at a low cost, as well as with low losses during operation, the holding current of the contactor is maintained constant in its average value more or less independent of the shape and amplitude of the control voltage present.

A further object of the present invention is to specify a circuit arrangement of the above named type in which the turn-off time of the contactor is controllable.

Moreover, the reliable turn-on of the contactor should be guaranteed by the circuit arrangement regardless of the shape and amplitude of the available input voltage.

SUMMARY OF THE INVENTION

These and other objectives are solved by the circuit arrangement of the present invention. The circuit arrangement for driving a contactor includes a control circuit of the contactor, a controllable switching element, a measuring resistor and the contactor coil of the contactor are in series with a control voltage source and the switching element co-operates with a regulation device such that the contactor is supplied with a starting current of constant average value and the regulation device is connected to a switchover device for selecting different starting currents, corresponding to the power classes of different contactors. A circuit arrangement of this sort is beneficial to the user since he now needs only a single type of driving component for the user's system. Moreover, the user can equip the user's system with other contactors, as can become necessary, for example, in conjunction with power increases in the connected loads, without also having to exchange the driving component. A further advantage of the circuit arrangement is seen in that the user is not bound to a contactor type due to the driving component. This simplifies system planning.

According to a feature of the present invention, a reference voltage can be set depending on the power class of the contactor to be driven. The average value of the starting current is regulated depending on the magnitude of this reference voltage. Voltage setting of this sort can be carried out reliably with simple means. Moreover, the voltage setting can be precisely matched to the connected contactor type.

Another objective is solved according to the present invention in that a free-wheeling branch having a free-wheeling diode and a free-wheeling switching element is connected to the contactor coil, the free-wheeling switching element being driven by a monoflop via a free-wheeling optocoupler, which co-operates with the free-wheeling switching element via a zener diode stabilizer, and the switching times of the monoflop being adjustable via an RC divider whose ohmic component is selectable via a further coding switch.

Due to the fact that the energy stored in the coil of the contactor is dissipated in a controlled manner in a free-wheeling branch, the turn-off time of the contactor can be controlled. Using this control system, a turn-off time corresponding to the power class, cooling means and the required switching times of the contactor is specified. In addition, the overvoltages occurring when switching off contactor coils are suppressed in this manner.

According to another feature of the present invention, the monoflop is also drivable by a voltage evaluation device which is connected to the control voltage source. In this manner, the turn-off time of the contactor can be automatically controlled depending on the control voltage. Thus, for example, the turn-off time of the contactor can be correspondingly shortened if control voltages corresponding to short switching times are specified by the control voltage source.

According to a further development of the circuit arrangement, a programmed switching sequence for driving the contactor can be specified. For example, a programmable controller (SPS) can be connected as the programmable control device. Instead of or in addition to the programmable controller for the contactor, a mechanical actuating device is connected to switch the contactor Manual operation is possible as a result.

The programmable controller turns the contactor on and off in that the logic element for driving the switching element in the control circuit of the contactor has a separate voltage applied to it.

According to a further feature of the present invention, the measurement voltage proportional to the magnitude of the starting current of the contactor is compared with an adjustable reference value, the magnitude of the reference value being set using a voltage divider. With an appropriate control element, the user specifies which contactor type is to be driven. In this manner, the user sets on the voltage divider a divider ratio which corresponds to a reference voltage which leads by way of the regulation to the setting of a suitable starting current. Due to the fact that different starting currents for a contactor can be specified through a corresponding reference voltage, the switchover for driving contactors of different power classes is implemented with commercially available and rugged components.

Another objective is solved in that the switching element co-operates with a pulse-width modulator which specifies the time windows for controlling the ON state of the switching element by evaluating the contactor control voltage present during operation.

In order to obtain a control signal for driving the switching element which controls the switching element correspondingly long in the ONE state for a low control voltage, it is advantageous if the pulse-width modulator includes an oscillator and a monoflop connected to it to whose input an RC element is connected which has the contactor control voltage applied to it during operation.

For driving the switching element, it is advantageous if the monoflop is connected via a logic unit and a driver stage with the switching element.

Reliable turn-on of the contactor is guaranteed if in the described circuit arrangement in which a measuring resistor and the contactor coil of the contactor are in series and the switching element can be controlled with driver electronic circuitry, a voltage waveform stage is provided for monitoring the contactor control voltage and the driver electronic circuitry is coupled to the voltage waveform stage.

According to a further development of the invention, it is advantageous if the voltage waveform stage includes a voltage evaluation stage forming the average value of the contactor control voltage and a voltage ramp connected to it having a turn-on and a turn-off threshold.

For further electronic processing of the contactor control voltage and subsequent formation of the average value, it is advantageous if the voltage evaluation stage includes a voltage divider which is followed by a low-pass filter.

The formation of a turn-on and a turn-off threshold is realized in a simple manner if the voltage ramp has two voltage dividers, with each of them being followed by a comparator.

Moreover, It is advantageous if the outputs of the comparators co-operate with a flipflop connected to the output such that it delivers a turn-on signal to the driver electronic circuitry if the divided contactor control voltage exceeds the turn-on threshold and delivers a turn-off signal if the divided contactor control voltage falls below the turn-off threshold. It is achieved in this manner without major expense that the driver electronic circuitry does not drive the switching element until the contactor control voltage exceeds the turn-on threshold and this state is maintained until the contactor control voltage drops below the turn-off threshold.

DETAILED DESCRIPTION

Figure 1:
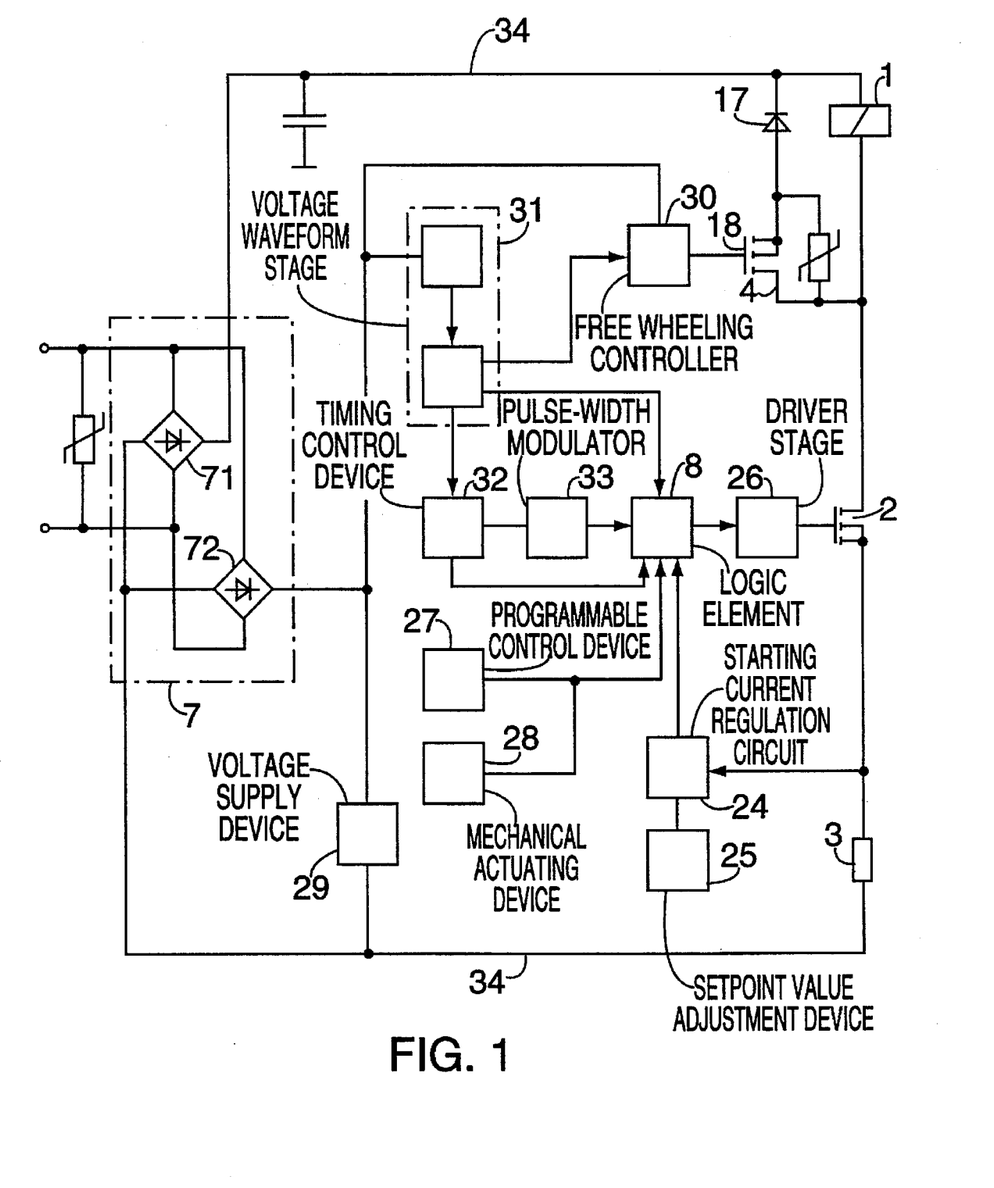
FIG. 1 is a block circuit diagram of the entire circuit arrangement constructed according to the present invention.

The control circuit 34 of a contactor shown in FIG. 1 includes a rectifier block 7 of a control voltage source and connected in series with this is a contactor coil 1, a switching element 2 and a measuring resistor 3. A starting current regulation circuit 24 is connected to the measuring resistor 3. The starting current regulation circuit 24 co-operates via a logic element 8, which is connected via a driver stage 26 to the switching element 2, with the switching element 2.

Moreover, a setpoint value adjustment device 25 is connected to the starting current regulation circuit 24. The logic element 8 is also connected to a programmable control device 27 as well as a mechanical actuating device 28. In addition, the logic element 8 is driven by a voltage waveform stage 31 either directly or via a timing control device 32 with a pulse-width modulator 33 connected to it.

The rectifier block 7 contains a first bidirectional rectifier 72 to which the control circuit 34 is connected and a second bidirectional rectifier 72 which feeds a supply circuit for the voltage waveform stage 31 and a free-wheeling controller 30. Moreover, there is also a voltage supply device 29 in this supply circuit which provides the operating voltage for all loads in the circuit arrangement which are not supplied directly by the rectifier block 7.

A free-wheeling branch 4 is connected to the contactor coil 1. A free-wheeling switching element 18 and a free-wheeling diode 17 are arranged in series in this free-wheeling branch 4. The free-wheeling controller 30 is connected to the control input of the free-wheeling switching element 18. There is a signal connection between the free-wheeling controller 30 and the voltage waveform stage 31.

Figure 2:
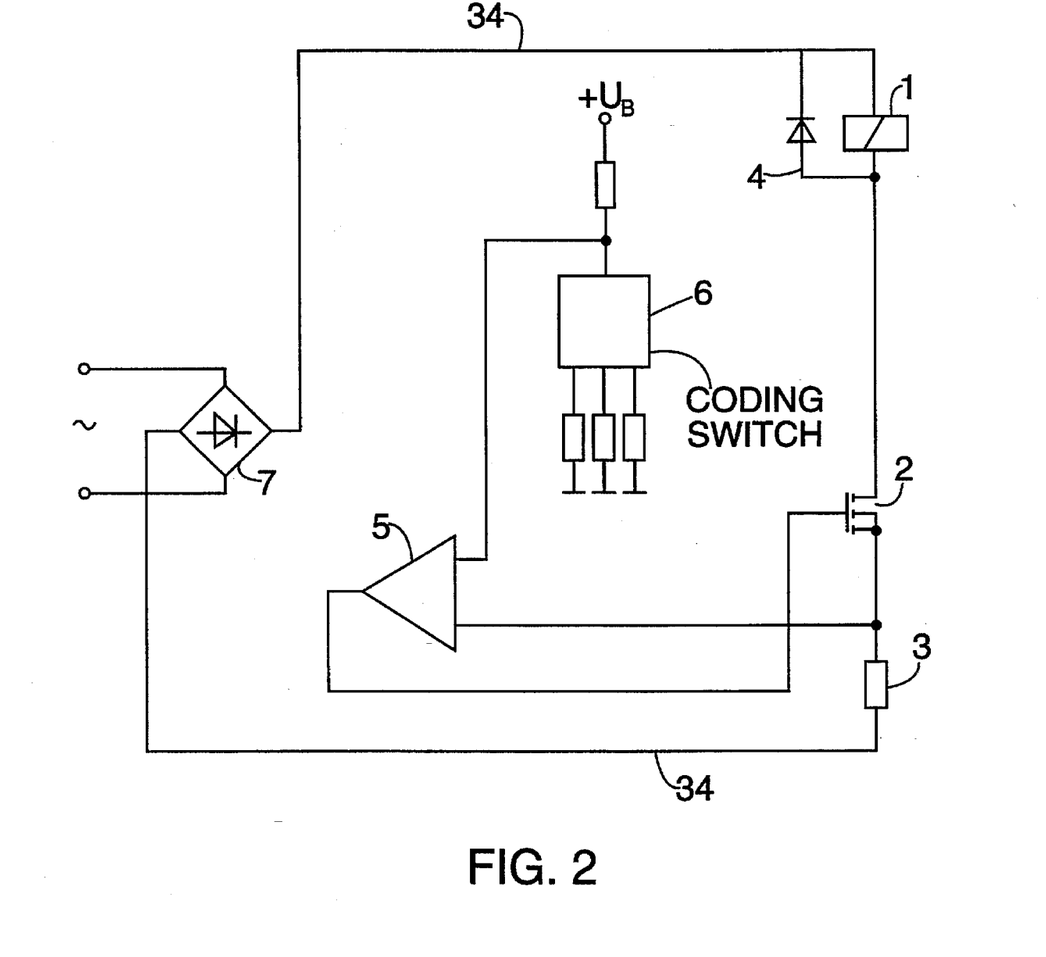
FIG. 2 is a detailed circuit diagram of the regulator of the starting current.

FIG. 2 shows detail of the control circuit 34 of the circuit arrangement. The output of a comparator 5 is connected to the control input of the switching element 2. A first input of the comparator 5 is connected to the measuring resistor 3. A coding switch 6 is connected to a second input of the comparator 5.

The function of the regulator of the starting current is explained in greater detail hereafter. As soon as an appropriate control signal from a higher-ranking regulator is connected to the control circuit 34 of the contactor, a control current flows in the control circuit 34. The switching element 2 is initially turned on so that the contactor coil 1 has current applied to it and the contactor responds. The measurement voltage across the measuring resistor 3 is proportional to the starting current. Its average value is held constant through control of the switching element 2. For this purpose, the measurement voltage tapped from the measuring resistor 3 is fed to the first input of the comparator 5. A reference voltage is fed to a second input of the comparator 5. In the comparator 5, the measurement voltage is compared with this reference voltage. Using the coding switch 6, the divider ratio of a voltage divider and thus the magnitude of the reference voltage can be altered. The switching threshold of the comparator 5 changes accordingly. The reference voltages selectable using the divider ratio correspond to the respective starting currents of the different power classes of the contactors which can be driven by the circuit arrangement. Whenever the measurement voltage is greater than or equal to the reference voltage, there is a signal present at the output of the comparator 5 which turns off the switching element 2. This interrupts the flow of current in the control circuit 34. The measurement voltage across the measuring resistor 3 goes to zero and is thus less than the reference voltage. As a consequence, the output voltage of the comparator goes to zero. The switching element 2 becomes conductive again. As a result, a measurement voltage drops across the measuring resistor 3 anew. The result is a pulsating actuation of the switching element 2. The magnitude of the starting current is yielded by the ratio of the turn-on times to the turn-off times of the switching element 2. This ratio is itself dependent on the set reference voltage. The magnitude of the starting current in the control circuit 34 is maintained constant by the closed control loop formed by the measuring resistor 3, the comparator 5, the logic element 8 and the switching element 2. The actual value/setpoint value comparison is carried out in the comparator 5. The switching element 2 is the control element of this control circuit.

Figure 3:
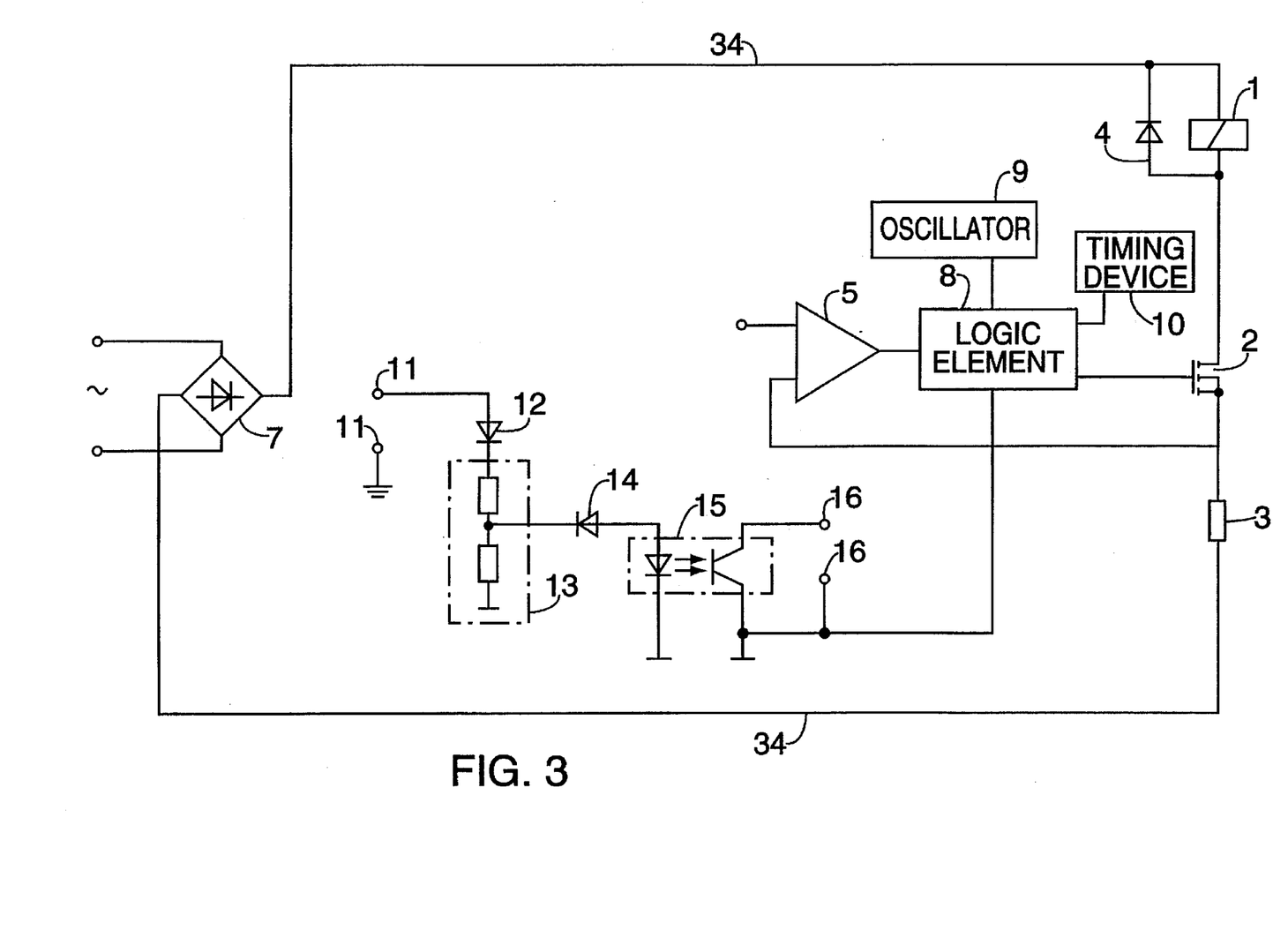
FIG. 3 is a detailed circuit diagram of the further development of the regulator of the starting current.

In the further development of the regulator of the starting current shown in FIG. 3, a logic element 8 is also connected between the output of the comparator 5 and the control input of the switching element 2. An oscillator 9 and a timing device 10 are connected to the logic element 8. In addition, the logic element 8 is provided with connections 16 for the mechanical actuating device 28 as well as connections 11 for the programmable control device 27. The connections 11 are connected to the logic element 8 via a diode 12, a voltage divider 13, a zener diode 14 and an optocoupler 15.

As soon as the contactor has responded, a switchover is made via the logic element 8 to an oscillator 9. The oscillator 9 provides a pulse pattern corresponding to the specified non-drop-out value of the contactor. Switching times can be specified to the logic element 8 via the timing device 10. The output signals of the comparator 5 are not taken into account in this state.

However, through appropriate priority regulation of the logic element 8, the contactor can be turned off at any time via the mechanical actuating device 28 (FIG. 1) connected to the connections 16. A turn-off signal can also be supplied by the programmable control device 27 (FIG. 1) connected to the connections 11. The coupling of the programmable control device 27 via the diode 12, the voltage divider 13 and the zener diode 14 is for the purpose of voltage stabilization. Electrical isolation of the separate voltage supplied by a programmable controller with respect to the logic element 8 is guaranteed by the optocoupler 15. Using the connected programmable control device 27, entire switching sequences for the contactor can be run through.

Figure 4:
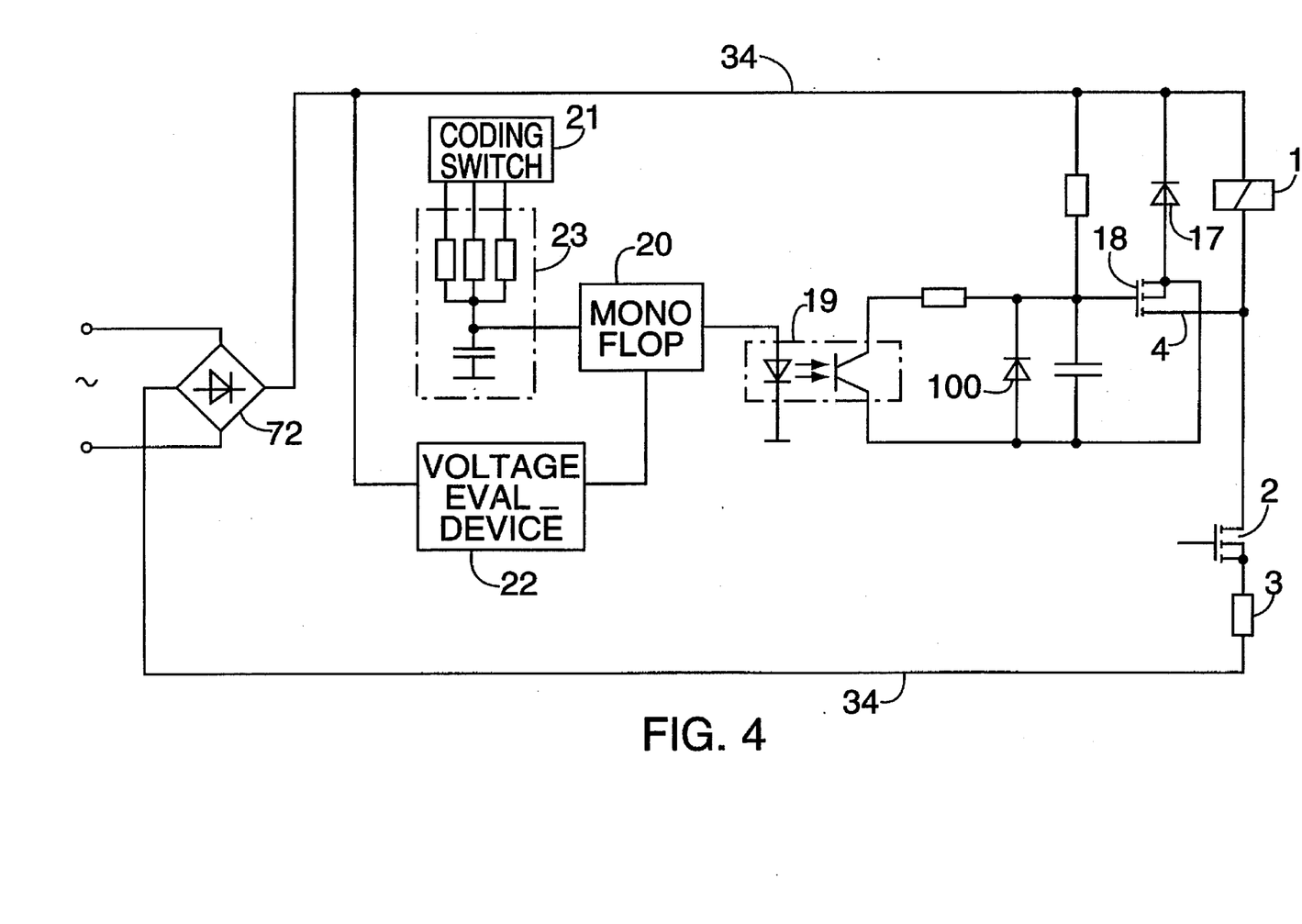
FIG. 4 is a detailed circuit diagram of the regulator of the turn-off time.

FIG. 4 shows in particular a circuit for controlling the free-wheeling branch 4. A monoflop 20 is connected to the free-wheeling switching element 18 via a free-wheeling optocoupler 19 and a zener diode stabilizer 100. The monoflop 20 is connected to a voltage evaluation device 22 and an RC divider 23 which is set via a further coding switch 21. The voltage evaluation device 22 is connected to the second bidirectional rectifier 72.

To turn off the contactor, the energy stored in the contactor coil 1 must be dissipated in the free-wheeling branch 4. Due to the fact that the free-wheeling switching element 18 is arranged in the free-wheeling branch 4 along with the free-wheeling diode 17, this energy dissipation can be carried out in a controlled manner. The duration in time of the energy dissipation is determined by the turn-on times of the free-wheeling switching element 18. The free-wheeling switching element 18 is turned on or off corresponding to the signals transferred in a floating manner from the monoflop 20 via the optocoupler 19. The triggering of the monoflop takes place by an RC divider 23. Due to the fact that the ohmic component of the RC divider 23 can be altered using a further coding switch 21, an operator can set timing information on the RC divider 23 within which the contactor drops out in a defined manner. Another control possibility is provided by the voltage evaluation device 22. Here, depending on the voltage supplied by the control voltage source, the monoflop 20 is triggered.

Figure 5:
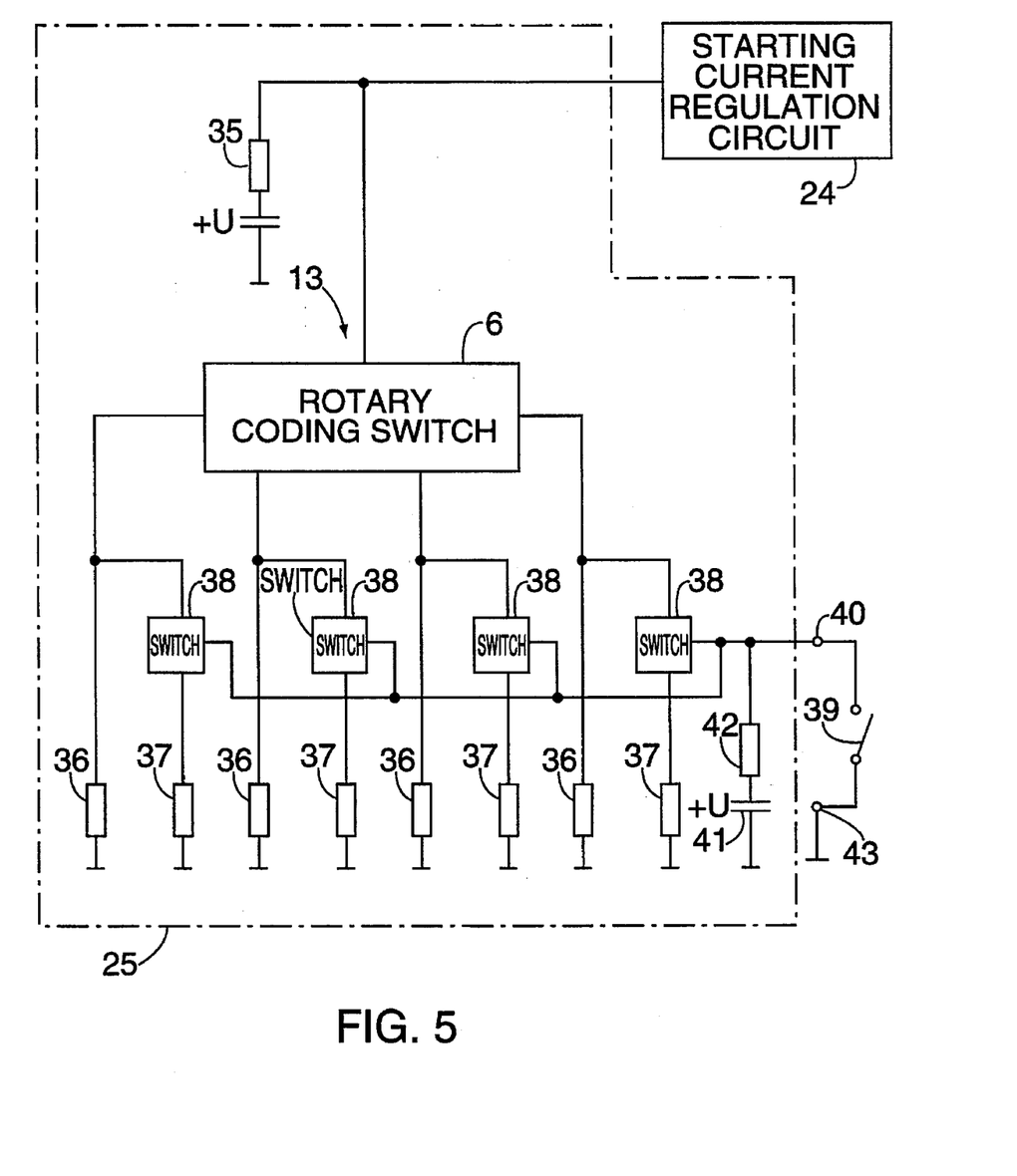
FIG. 5 is a detailed circuit diagram of a setpoint value adjustment device.

FIG. 5 shows a detailed circuit diagram for the setpoint value adjustment device 25.

The setpoint value adjustment device 25 includes a voltage divider 13 which comprises a primary resistor 35 and several secondary resistors 36, each of which is selectable using a rotary coding switch 6. Each secondary resistor 36 has a special resistor 37 which can be switched in parallel to it using an electronic switch 38.

The electronic switches 38 are connected in each case with their control connection via a limiting resistor 42 to the one terminal of an auxiliary voltage source 41 whose other terminal is connected to ground. Moreover, at the interconnection point of the control connections with the limiting resistor 42, a push-button switch 39 is connected with its one connection contact 40. The other connection contact 43 of the push-button switch 39 runs to ground.

If the user of this contactor replaces its contactor coil 1 with an energy-saving special coil, it is necessary to be able to select a further special voltage in addition to the previously selectable reference voltages.

Due to the fact that the special coil requires a lower starting current, the reference voltage must also be appropriately set on the voltage divider 13. This takes place by operating the push-button switch 39. The electronic switching elements 38 receive a control impulse as a result. The electronic switches 38 are designed such that this control impulse leads to the closing of the switches 38. As a result, a special resistor 37 is switched in parallel to each of the secondary resistors 36. Thus, special voltages corresponding to different power classes are selectable via the rotary coding switch 6 also for contactors fitted with a special coil.

Figure 6:
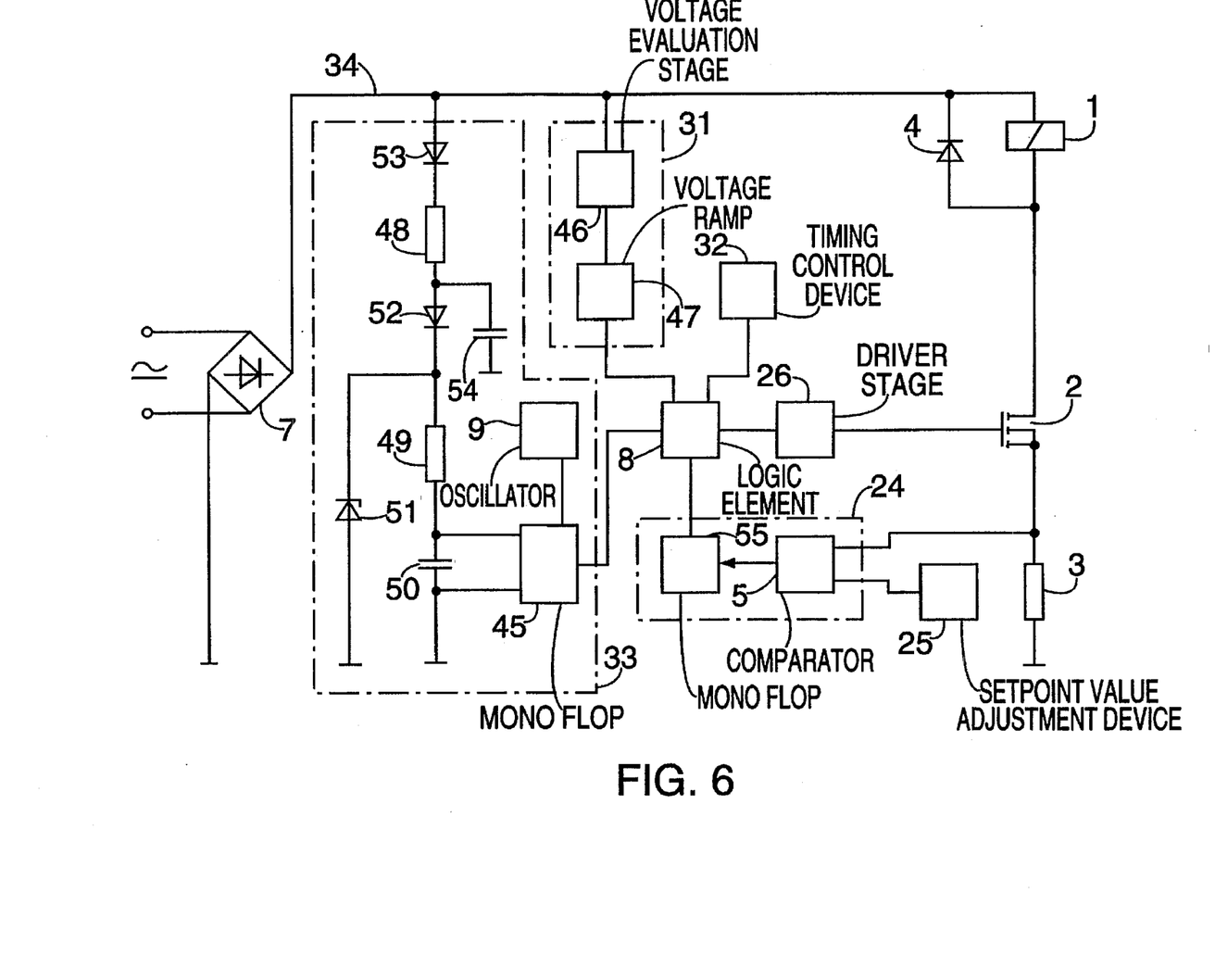
FIG. 6 is a detailed circuit diagram with a pulse-width modulator for generating a holding current.

FIG. 6 shows the control circuit 34 with a detailed representation of the pulse-width modulator 33 according to FIG. 1. The contactor coil 1, the switching element 2 and the measuring resistor 3 are connected in series with the rectifier block 7. The free-wheeling branch 4 lies in parallel to the contactor coil 1. The voltage present across the measuring resistor 3 due to the contactor current is connected to the input of the starting current regulation circuit 24, which comprises the comparator 5 and a monoflop 55 connected to its output. This is joined by the series circuit comprising the logic element 8 and the driver stage 26, which is connected to the switching element implemented, e.g., as transistor 2. In addition, the setpoint value adjustment device 25 is connected to the input side of the comparator 5; the setpoint value adjustment device 25 is used to specify an adjustable reference voltage as a threshold. If the measurement voltage exceeds the reference voltage, the comparator 5 sends a tripping signal to the monoflop 55, which generates in response a time window of constant duration, e.g., one millisecond, upon expiration of which the turned-on switching element 2 is switched to the OFF state via the logic element 8 and the driver stage 26. This means that the contactor 1 has a specified current applied to it through the opening and closing of the switching element 2. The magnitude of this current can be set based on the duty factor. The timing control device 32 and the voltage waveform stage 31 are also connected to the logic element 8. The timing control device 32 specifies the duration of the starting phase of the contactor 1 during which a relatively high starting current is required.

The voltage waveform stage 31 comprises a voltage evaluation stage 46 which forms an average value formation of the contactor control voltage present at the output of the rectifier block 7 and of a voltage ramp 47 through which a turn-on and a turn-off threshold is specified. The control of the switching element 2 via the starting current regulation circuit 24 takes place only during the interval specified by the timing control device 32, it being a further condition that the average value formed by the voltage evaluation stage 46 for the turn-on must initially exceed the turn-on threshold of the voltage ramp 47 and then hold up until the average value falls below its turn-off threshold. The linking of these conditions takes place via the logic element 8. After the starting phase, the holding phase of the contactor follows, during which the holding current is smaller than the starting current by a factor of about 20 to 30. The holding current is realized using the pulse-width modulator 33 which is coupled to the logic element 8. The pulse-width modulator 33 comprises a voltage divider formed by ohmic resistances 48,49, a capacitor 50 to ground also being connected in series with the ohmic resistance 49. The voltage divider is connected via a damping diode 53 with its ohmic resistance 48 to the control voltage source. A blocking diode 52 is connected between the ohmic resistances 48 and 49. A monoflop 45 lies in parallel to the capacitor 50, to this monoflop 45 an oscillator 9 is connected. The voltage divider provides a representation of the control voltage at a low level, the capacitor 50 being charged up accordingly with a time constant determined by the RC element 49,50. A zener diode 51 lies in parallel to the RC element 49,50 by way of which zener diode 51 the monoflop 45 is protected against overvoltages. For each clock pulse delivered by the oscillator 9, the monoflop 45 reacts with a time window whose duration is determined by the control voltage instantaneously present on the voltage divider such that for a small voltage amplitude, the charging of the capacitor 50 lasts correspondingly longer. As a result, a correspondingly wide time window results at the output of the monoflop 45 which leads to a correspondingly long turn-on duration for the switching element 2. In contrast, for a high voltage amplitude of the control voltage, a correspondingly narrow time window results at the output of the monoflop 45 since in this case the charging of the capacitor 50 takes place very quickly.

The damping diode 53, like the blocking diode 52, serves to avoid reverse currents. At the interconnection point between the ohmic resistance 49 and the diode 52, a capacitor 54 is connected to ground which serves to smooth out the divided contactor control voltage present. When operating the control circuit 34 with an alternating voltage, a pulsating direct voltage results at the output of the rectifier block 7 which would lead to undefined signals in the vicinity of the zero points without the use of the additional capacitor 54.

If the pulsating direct voltage lies below the value of the zener diode 51, more time is required for the charging procedure of the capacitor 50. The pulse width at the output of the monoflop 45 changes as a function of the control voltage. If the control voltage becomes smaller than the zener voltage of the zener diode 51, the pulse becomes wider. For a higher control voltage, the pulse becomes narrower. The switching transistor 2 is driven via the logic element 8 and the driver stage 26 with the signal produced in this manner such that the contactor is maintained with a constant holding current in the "ON" contactor position more or less independent of the control voltage.

Figure 7:
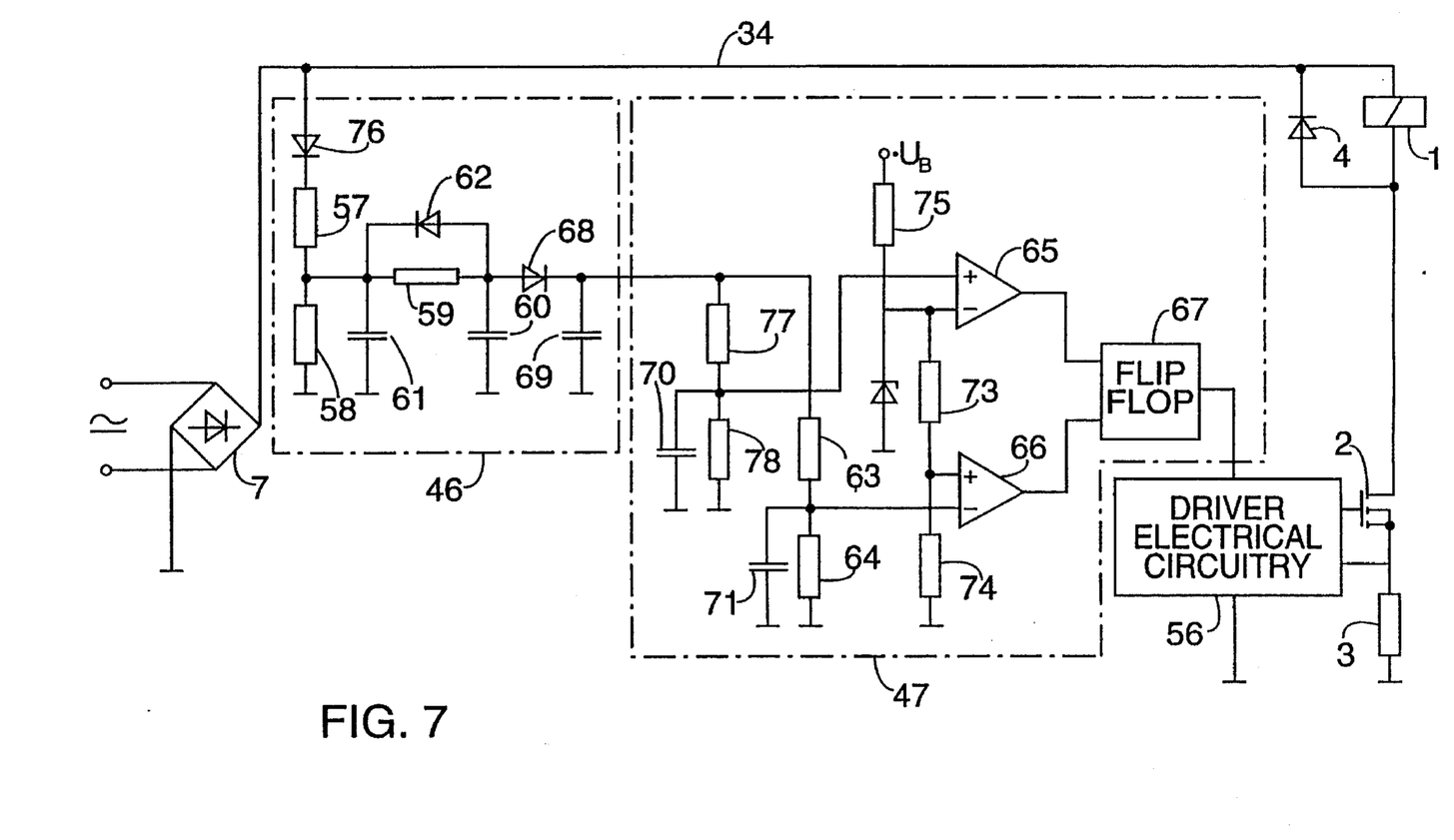
FIG. 7 is a control circuit with detailed representation of the voltage waveform stage.

In FIG. 7, the control circuit 34 of the contactor according to FIG. 1 is reproduced with a detailed representation of the voltage waveform stage 31. It includes a voltage evaluation stage 46 and a voltage ramp 47 and lies between the control voltage source and the driver electronic circuitry 56, which contains mainly the starting current regulation circuit 24, the setpoint value adjustment device 25, the logic element 8 and the driver stage 26.

The voltage evaluation stage 46 contains on the input side a diode 76 and connected in series with this a voltage divider formed by the ohmic resistances 57,58 which has connected at its output a fed-back low-pass filter consisting of an ohmic resistance 59, two capacitors 60,61 and a diode 62. The resistor 59 is connected on one end to the interconnection point of the resistors 57,58 and is connected on the other end via the capacitor 60 to ground. The capacitor 61 is connected in parallel to the resistor 58, and the diode 62 in parallel to the resistor 59. In series with the resistor 59, there is a diode 68 which is connected to ground on the cathode end via a capacitor 69.

The voltage evaluation stage 46 designed in this way is coupled via the interconnection point between the diode 68 and the capacitor 69 to the voltage ramp 47. This is formed essentially from two threshold value stages of which one serves to create the input threshold and the other to supply the output threshold. Both threshold value stages are provided on the input side in each case with an adapted voltage divider. For the turn-off threshold, the voltage divider formed by the ohmic resistances 77,78 is provided, at whose common interconnection point on the one hand the capacitor 70 runs to ground and on the other hand the comparator 65 is connected. The further input connection point of the comparator 65 is connected via a divider circuit 73,74,75 at a constant voltage $U_B$ to a fixed voltage potential as a reference. The capacitor 70 running to ground lies in parallel to the resistor 78.

The other threshold value stage is designed in a corresponding manner. It contains a voltage divider formed by the ohmic resistances 63,64, a capacitor 71 running to ground being connected in parallel to the resistor 64. A comparator 66 is connected to the common interconnection point of the resistors 63,64. A voltage potential defined by the stated divider circuit 73,74,75 lies at its other input.

Both comparators 65,66 are connected via a flipflop 67 to the driver electronic circuitry 56.

The function of the voltage waveform stage 31 is explained in greater detail hereafter.

The contactor control voltage is divided down to a low level by the voltage divider 57,58. In the subsequent low-pass filter 59,60,61,62, average value formation takes place in a manner such that the divided contactor control voltage is summed up and stored in the subsequent capacitor 69. The diode 62 serves the purpose of feedback, whereas the other diode 68 acts as a peak-value detector.

The average voltage value formed in this manner is divided down in the turn-on threshold stage to a suitably adapted level by the voltage divider 70,77,78 and fed to the input of the comparator 65. The turn-on threshold is specified by the reference voltage present at the other input. If the representation of the contactor control voltage exceeds this reference voltage, this leads to a signal change at the output of the comparator 65 and then also at the output of the following flipflop 67.

The above described turn-off threshold stage works in a corresponding manner, with a signal change taking place at the output of the comparator 66 only if the divided contactor control voltage at the input of the comparator 66 falls below its reference level. This signal change also causes a change of the output signal on the flipflop 67, this occurring in a manner such that a driving of the switching element 2 takes place only after the contactor control voltage has exceeded the turn-on threshold and is maintained until the contactor control voltage falls below the turn-off threshold.

The circuit arrangement according to the invention allows universal current driving of contactors, i.e., operation of the contactor regardless of the shape and magnitude of the available input voltage for the circuit.

The circuit arrangement is also advantageous in that contactor coils with different designs can be used. Instead of the a.c. coils conventionally used in contactors, d.c. coils can also be used, which are advantageous in that they save energy both in starting as well as in the specified non-dropout value. The d.c. coils can be wound in a much denser manner, i.e., full winding is also possible, which, due to the higher copper component, entails lower losses during operation. The higher copper component also allows the use of smaller control transformers. This means that great demand exists for the circuit arrangement according to the invention with the flexibility for using different contactor coils.

Due to the diversity of possible settings, an operator can easily manage the specifications corresponding to the operator's specific application case, e.g., switching cycles and/or the amplitude of the starting current. These possible settings make it feasible to drive with a single driving component in each case contactors of different power classes. A driving component of this sort can be subsequently mounted upstream of an already installed contactor, in particular on a top-hat rail. The contactor can also be provided by the manufacturer with the component. The use of just a single driving component for contactors of different power classes entails advantages for the manufacturer of such a component as well as for the user. The manufacturer obtains savings in production. The user enjoys greater ease of operation as well as simpler maintenance due to the fact that the user now requires only a single type of driving component.

I claim:

1. A circuit arrangement for driving a contactor, comprising:

a controllable switching element;

a contactor coil; and a measuring resistor coupled between and in series with said controllable switching element and said contactor coil;

a control voltage source coupled in series with said controllable switching element, contactor coil, and measuring resistor;

a regulation device coupled to said switching element such that said contactor is supplied with a starting current having a constant average value and said regulation device is coupled to a switchover device, said switchover device selecting from a plurality of different starting currents corresponding to power classes of different contactors;

a free-wheeling branch coupled to said contactor coil, said free-wheeling branch including a free-wheeling diode coupled to a free-wheeling switching element; and a first monoflop coupled to and driving said free-wheeling switching element via a free-wheeling optocoupler and a zener diode stabilizer, such that switching times of said first monoflop are capable of being adjusted via an RC divider circuit coupled to said first monoflop, said RC divider circuit having an ohmic component that is capable of being selected via a coding switch.

2. The circuit arrangement of claim 1 further comprising:

a first comparator having first and second inputs and an output, wherein a measurement voltage dropping across said measuring resistor is fed to the first input of said first comparator and an adjustable reference voltage designating a starting current of the contactor is capable of being connected to the second input of the first comparator and the output of said first comparator is coupled to said switching element, such that said switching element is controlled by an output signal of said first comparator.

3. The circuit arrangement of claim 1 further comprising:

a voltage evaluation device coupled to said control voltage source, said voltage evaluation device driving said first monoflop.

4. The circuit arrangement of claim 2, further comprising:

a logic element coupled between the output of the first comparator and the switching element; and a programmable control device coupled to said logic element.

5. The circuit arrangement of claim 2, further comprising:

a logic element coupled between the output of the first comparator and the switching element; and a mechanical actuating device coupled to said logic element.

6. The circuit arrangement of claim 2 further comprising:

a voltage divider circuit coupled to the second input of the first comparator, said voltage divider circuit includes a coding switch that controls a divider ratio of said voltage divider circuit.

7. The circuit arrangement of claim 2, further comprising:

a pulse-width modulator coupled to said switching element, said pulse-width modulator specifies time windows for controlling the ON state of the switching element by evaluating a contactor control voltage present during operation of said contactor.

8. The circuit arrangement of claim 7 wherein said pulse-width modulator includes an oscillator coupled to a second monoflop, said second monoflop having an input, such that an RC element is coupled to the input of said second monoflop and the contactor control voltage is applied to said RC element during operation.

9. The circuit arrangement of claim 8, wherein said second monoflop is coupled to said switching element via said logic element and a driver stage.

10. The circuit arrangement according to claim 9, further comprising:

a voltage waveform stage monitoring the contactor control voltage; and driver electronic circuitry coupled to said voltage waveform stage and controlling said switching element.

11. The circuit arrangement of claim 10, wherein said voltage waveform stage includes a voltage evaluation stage forming the average value of the contactor control voltage and a voltage ramp device connected to said voltage evaluation stage, said voltage ramp device having a turn-on and a turn-off threshold.

12. The circuit arrangement of 11, wherein said voltage evaluation stage includes a voltage divider followed by a low-pass filter.

13. The circuit arrangement of claim 11 wherein said voltage ramp includes two voltage divider circuits, each being coupled to second and third comparators.

14. The circuit arrangement of claim 13 wherein each of said second and third comparators has an output coupled to a flipflop, such that said flipflop generates a turn-on signal to said driver electronic circuitry if the contactor control voltage from said voltage divider circuits exceeds a turn-on threshold and delivers a turn-off signal if the contactor control voltage from said voltage divider circuits falls below a turn-off threshold.

* * * * *